Jan. 20, 1931.  S. V. DILLON  1,789,379
PIPE COUPLING
Filed Aug. 25, 1927  3 Sheets-Sheet 1
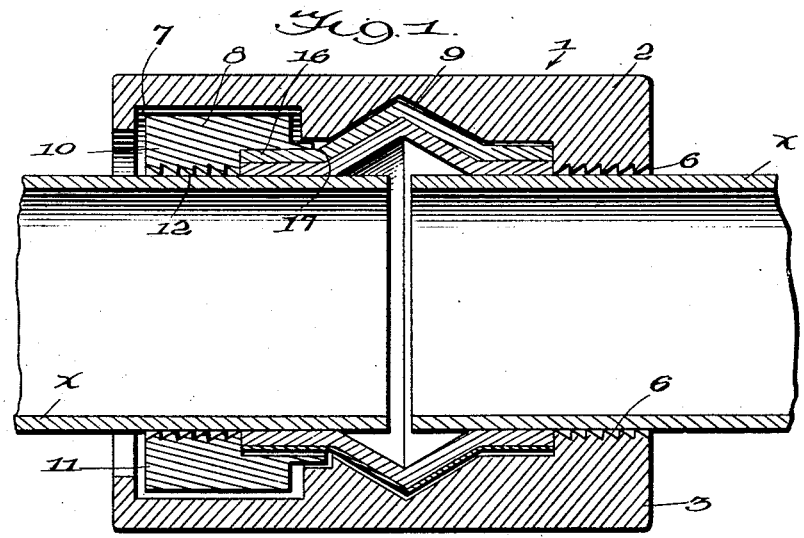
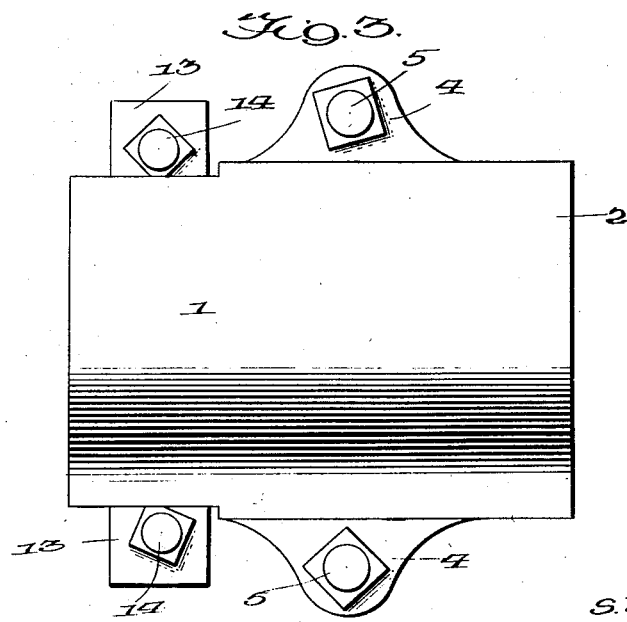
Inventor
S. V. Dillon
By
Attorney

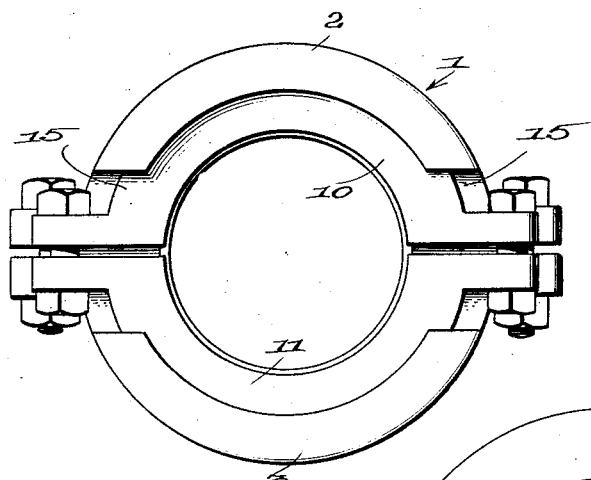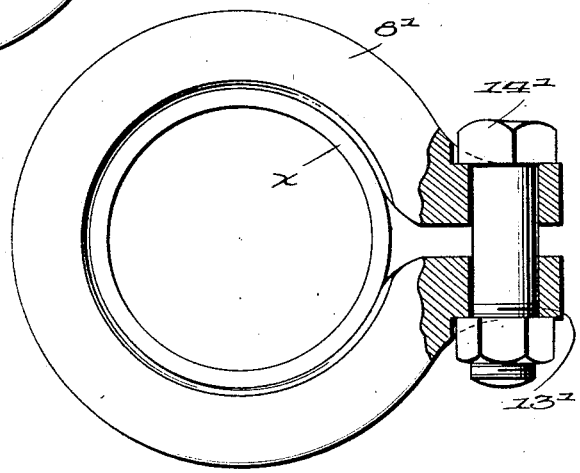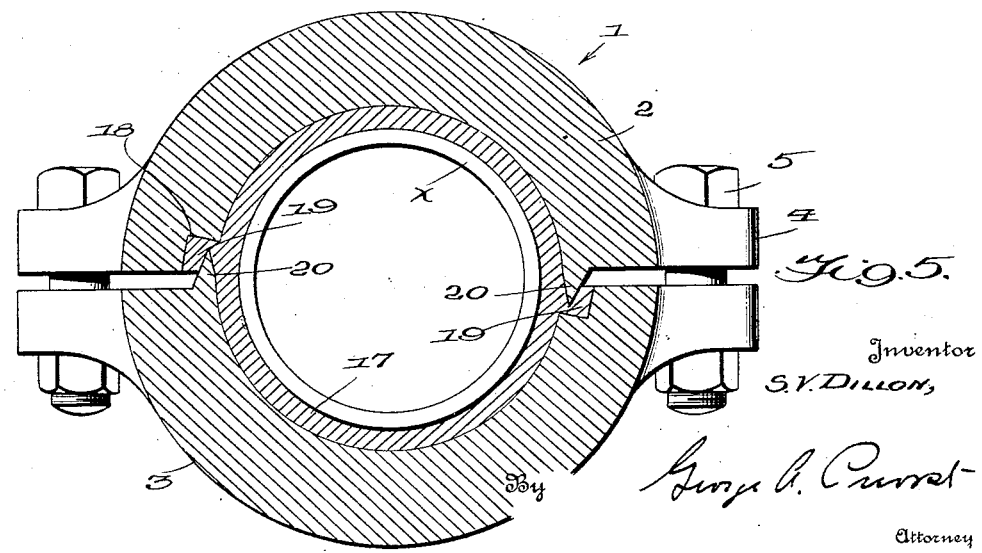

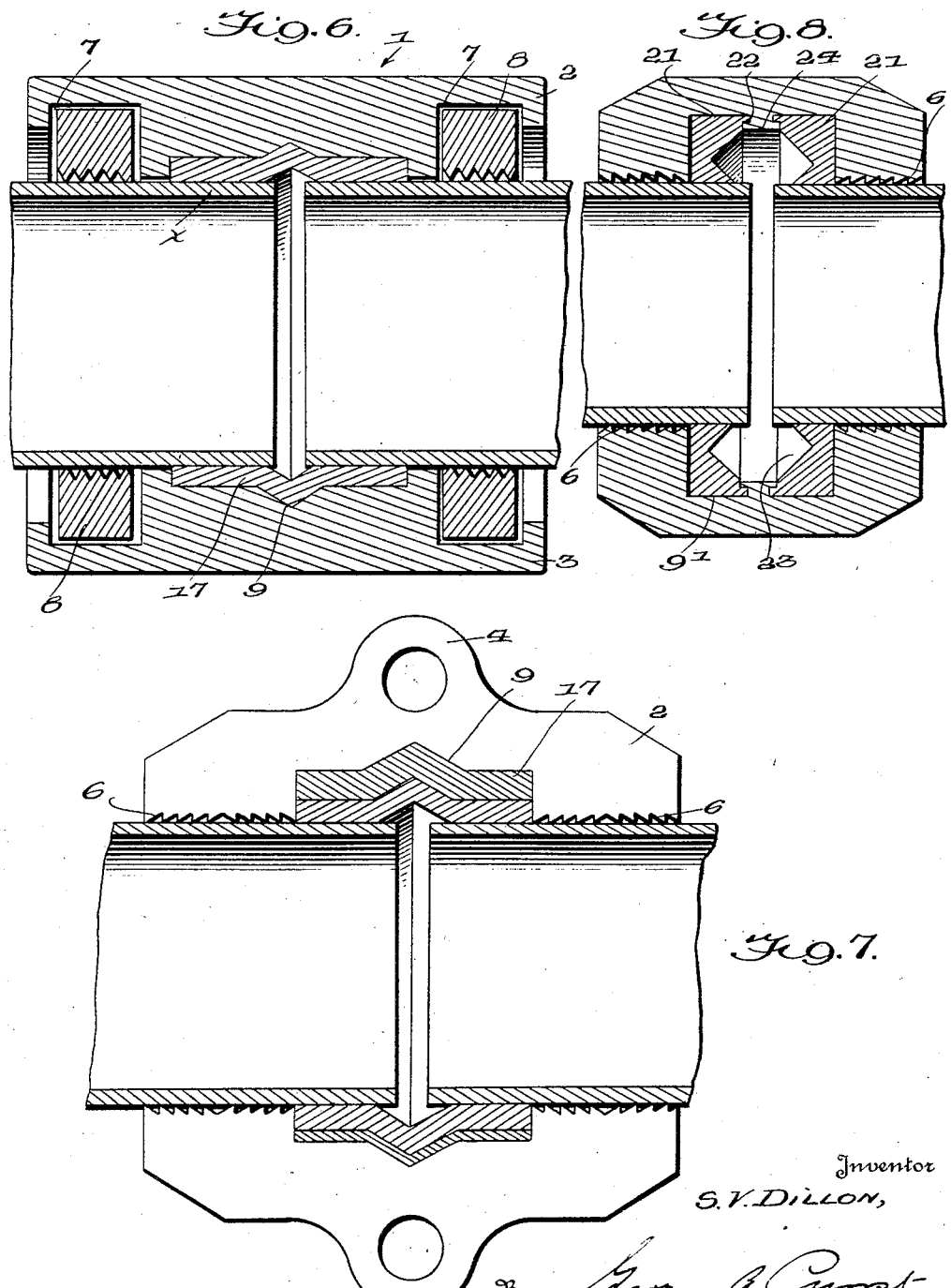

Patented Jan. 20, 1931

1,789,379

UNITED STATES PATENT OFFICE

STEPHEN V. DILLON, OF TULSA, OKLAHOMA

PIPE COUPLING

Application filed August 25, 1927. Serial No. 215,346.

My invention consists in new and useful improvements in pipe joints, and has for its object to provide a joint or coupling which may be used with any kind of pipe, regardless of how it is finished.

Another object of my invention is to provide a device of this character, constructed and arranged in such a manner that the pipe gripped thereby will be positively prevented from slipping in either direction.

A further object of my invention is to provide a novel method of coupling pipes in either a rigid or flexible joint, as different conditions may require.

Still further objects of my invention are simplicity in construction and operation, durability of the parts, and the comparatively low cost of manufacture.

With the above and other objects in view which will appear as the description proceeds, my invention consists in the novel features herein set forth, illustrated in the accompanying drawings, and more particularly pointed out in the appended claims.

Referring to the drawings, in which numerals of like character designate similar parts throughout the several views, Fig. 1 is a cross section of an expansion joint made in accordance with my invention, applied to two sections of pipe, Fig. 2 is an end view of the same, and Fig. 3 is a plan view, showing one form of clamping means, Fig. 4 is an enlarged view of a modified form of clamping means, Fig. 5 is a lateral cross section of the device showing the sealing means, Fig. 6 is a modified form of expansion joint, in cross section, Fig. 7 shows a rigid joint constructed in accordance with my invention, and Fig. 8 is a view of a rigid joint showing a modified form of gasket.

Referring now particularly to Figs. 1 to 5 of the drawings, 1 designates the main housing, consisting of two similar halves or sections 2 and 3, semi-circular in lateral cross section, each of which is provided intermediate its ends with lugs or ears 4, integral therewith and extending outwardly from each side thereof, said ears being apertured to receive bolts 5, whereby said opposed sections are secured together around the pipe $x$, as hereinafter referred to. On the inner surface of each of the sections 2 and 3, at one end thereof, I provide a semi-circular jaw member, consisting of a plurality of inwardly projecting angularly disposed teeth 6, as clearly shown in Fig. 1 of the drawing, adapted to firmly grip and secure a section of pipe in place. At the opposite ends of the sections 2 and 3, the inner surface is recessed as at 7 to receive a clamp 8, hereinafter referred to more in detail, which recess merges into a recess 9 substantially V-shaped in cross section, intermediate the ends of the housing 1.

In the form of my invention shown in Figs. 1 to 3, the clamp 8 consists of two sections, 10 and 11, each of which is provided on its inner surface with a semi-circular jaw member having inwardly projecting teeth 12, disposed at an opposite angle to the teeth 6 of the housing jaw. The sections 10 and 11 are secured together around the adjacent section of pipe by means of bolts 14 which pass through the outwardly projecting ears 13 of each section, said ears passing through recesses 15 in the housing 1, and extending outwardly beyond said housing, whereby the same may be adjusted without removing the housing. It will be noted that the recess 7 is somewhat larger than the clamp 8, thus allowing the latter a predetermined longitudinal movement within said housing.

The inner surface of the clamp 8 at the inner end is recessed as at 16, to receive the end of the gasket member 17, said gasket being substantially V-shaped in cross section, its surfaces converging away from the axis of the pipe and extending into the V-shaped recess 9 in said housing. The gasket 17 may be integral or in sections, composed of rubber, soft metal or any other suitable material and is of sufficient thickness to engage the pipe slightly in advance of the teeth 6 and 12, whereby when said teeth are drawn together, said gasket will be pressed against the pipe to such an extent that a leak would be impossible. The intermediate portion of the gasket 17 is slightly spaced apart from the inner walls of the recess 9, whereby when said clamp 8 is caused to move in either direction in said recess 7, due to expansion or contraction of the pipe, said gasket will be permitted to bend upward or downward in said recess 9 without affecting the seal at the ends of said gasket.

With this gasket, whether used with a rigid or expansion type coupling, the pressure from the pipe line will force the ends of the gasket tightly against the pipe and housing, due to the converging surfaces of said gasket, and securely seal the same. A vacuum in the line will draw the raised portions of the gasket inwardly and force the ends longitudinally to seal the joint.

One of the inner edges of each of the sections 2 and 3 of the housing 1, is recessed longitudinally as at 18, Fig. 5, to receive a sealing member 19, which may be a separate strip of soft material such as rubber, lead or the like, or may be an integral extension of the gasket 17. The opposite inner edges of said sections 2 and 3 adjacent each of said recesses 18, are provided with longitudinally extending, sharp angular lips 20, which when said sections are secured together, as before mentioned, are adapted to sink into the sealing members 19, to further insure a leak proof joint.

In Fig. 4 I have shown a modified form of clamp, which may be used in lieu of clamp 8, within the housing 1. This clamp is similar so far as the angularly disposed teeth are concerned, to the clamp 8, but instead of consisting of two sections, as in the former case, it comprises an integral circular spring clamp 8′, its ends projecting outwardly into flanges or ears 13′ apertured to receive bolts 14′, by means of which said clamp is tightly secured around the pipe $x$, within the housing 1.

In Figure 6 I have shown another type of flexible joint which may be used as effectively as the one heretofore referred to. With this construction, instead of providing the housing with teeth or jaw members, I employ a gripping clamp 8 at each end thereof, said clamp being slidably mounted within recesses 7 in said housing. In this structure the gasket 17 is secured entirely by the housing 1.

In Fig. 7 I have shown one form of a rigid coupling or joint, wherein the sections of the housing 1 are provided on their inner surfaces at each end, with two sets of oppositely disposed angular teeth 6, integral therewith, the intermediate portions being recessed as at 9 to receive the gasket 17 of the type hereinbefore referred to. With this structure, it will be noted that movement of the pipe in either direction is prevented.

In Fig. 8 I have shown a rigid joint somewhat similar to that just described, with the exception of a modified form of gasket. With this structure, the housing 1 is recessed as at 9′, intermediate the jaws 6, said recess having an inwardly projecting flanged ring 24, extending centrally around the inner surface thereof. On each side of the ring 24, and secured in place by the flange thereof, I secure gaskets 21, the inner opposed faces of which are recessed angularly as at 23, the opposed outer edges being provided with outwardly projecting circumferentially extending lips 22, adapted to engage the ring 24, beneath its flanges.

With this structure it will be noted that if pressure is applied to the line it will enter the joint between the sections of pipe, which are slightly spaced apart, and the outward pressure, on account of the angular shape of the gasket on the inside, will press the same down against the pipe and upwardly against the inner walls of the housing, sealing the points where the gasket, pipe and first tooth of each jaw come in contact. If the reverse action is had and vacuum is put on the line, said vacuum will pull the gasket in the opposite direction, but with the same result.

It will be noted that the joints herein described, employing teeth which may be angularly disposed in either direction, will positively insure against the movement of the sections of pipe gripped thereby beyond the limits allowed for expansion and contraction. With joints heretofore known, it has been necessary to employ certain types of pipe. The pipe either had to be threaded for a coupling or plain on the ends, or raised or grooved at the ends, all of which was objectionable as well as expensive. With my improved coupling, this unnecessary expense is eliminated, and the coupling can be applied to any kind of pipe regardless of how it is finished. It provides a rigid joint or a flexible one, as desired, and due to the type of gasket used, the more pressure or the more vacuum applied, the tighter the joint will become.

From the foregoing it is believed that my invention may be clearly understood by those skilled in the art without further description, it being borne in mind that numerous changes may be made in the details of construction without departing from the spirit of the invention as disclosed in the following claims.

What I claim and desire to secure by Letters Patent is:—

1. An expansion pipe coupling comprising a main housing provided at one end with a jaw member adapted to grip a piece of pipe, and inwardly recessed at the opposite end, a clamp having a jaw member, movably mounted in said recess and adapted to grip an adjacent piece of pipe, a second inner recess intermediate the ends of said housing, merging into said first mentioned recess and having an upper face formed of surfaces which converge away from the axis of said pipe, a flexible gasket mounted in said recess, conforming in shape thereto, and secured against the pipe at one end by said housing and at the other end by said clamp and means for clamping said housing around said pipe.

2. A pipe coupling as claimed in claim 1 wherein said gasket is slightly spaced from the converging surfaces of said recess, whereby said pipe sections are permitted to move a predetermined distance longitudinally without breaking the seal.

3. A pipe coupling as claimed in claim 1 wherein said clamp consists of sections, the ends of each terminating in apertured ears adapted to receive bolts, the walls of said housing being slotted longitudinally at its recessed end to permit said ears to pass therethrough.

4. A pipe coupling as claimed in claim 1 wherein the housing jaw member is provided with a plurality of angular teeth disposed in one direction and said clamp jaw member is provided with a plurality of angular teeth disposed in the opposite direction.

5. The combination with two sections of pipe arranged in alignment with their adjacent ends spaced apart, a coupling consisting of sections provided at each end with a jaw member, said sections having recesses intermediate said jaw members, the recesses being provided with opposed surfaces which converge away from the axis of said pipes, a gasket mounted in said recesses, conforming in shape thereto, and having opposed under surfaces converging away from the axis of said pipes and open to the pressure incident to the spaced ends of said pipe, the longitudinal ends of said gasket engaging said sections of pipe, and means for clamping said coupling around said pipes.

6. A pipe coupling consisting of sections provided at each end with a jaw member, a gasket intermediate said jaw members, each of said sections being recessed longitudinally along one of its inner edges, and provided along the opposite inner edge with a sharp lip, a sealing member adapted to fit into each of said recesses, the lip of each section being adjacent the recess of the opposite section and adapted to engage said sealing member, and means for clamping said sections together.

7. A pipe coupling for joining the adjacent ends of two pipes in at least partially spaced relation, said coupling consisting of sections, provided at each end with a jaw member, each of said jaw members having a plurality of angular teeth oppositely disposed to those in the other jaw member, a gasket intermediate said jaw members having adjoining surfaces which converge away from the axis of the pipe engaged thereby, means for clamping said sections together around two sections of pipe and means for sealing the joint longitudinally.

8. A pipe coupling for joining the adjacent ends of two pipes in at least partially spaced relation, said coupling consisting of sections each provided at its ends with jaw members, recesses intermediate said jaw members, a gasket in said recesses having adjoining surfaces which converge away from the axis of the pipe engaged thereby, means for clamping said sections together and means for sealing the joint longitudinally.

9. A pipe coupling for joining the adjacent ends of two pipes in at least partially spaced relation, said coupling consisting of sections, each provided at its ends with jaw members, each having a plurality of angular teeth oppositely disposed to those in the other jaw member, parti-circular recesses intermediate said jaw members and having opposed surfaces which converge away from the axis of the pipe being clamped, a gasket in said recesses which conforms in shape thereto and having adjoining surfaces which converge away from the axis of said pipe, means for clamping said sections together around said pipe and means for sealing said joint longitudinally.

10. A pipe coupling as claimed in claim 9 wherein said gasket is so constructed that the sealing surface thereof projects beyond the extremities of the teeth of said jaw members before the sections are clamped together, whereby said gasket engages the pipe slightly in advance of said teeth.

11. The combination with a plurality of pipes arranged end to end and having their extremities slightly spaced apart, of a resilient sealing ring surrounding the pipe ends and having an internal groove communicating with the space between the pipe ends, said ring having inwardly extending sealing lips arranged at opposite sides of the groove and snugly engaging the peripheries of the pipes, a housing mounted on the pipe ends and having a groove in which the sealing ring is seated, and jaws movably mounted in the housing and having teeth biting into the peripheries of the pipes.

12. The combination with a plurality of pipes arranged end to end and having their extremities slightly spaced apart, of a resilient sealing ring surrounding the pipe ends and having an internal groove communicating with the space between the pipe ends, said ring having inwardly extending sealing lips arranged at opposite sides of the groove and snugly engaging the peripheries of the pipes, a housing mounted on the pipe ends and having a groove in which the sealing ring is seated, and jaws mounted in the ends of the housing and having teeth biting into the peripheries of the pipes, the jaws at one end of the housing being movable relatively to the housing.

In testimony whereof I affix my signature.

STEPHEN V. DILLON.